United States Patent
Cho et al.

(10) Patent No.: US 8,350,407 B2
(45) Date of Patent: Jan. 8, 2013

(54) HIGH VOLTAGE POWER SUPPLY APPARATUS

(75) Inventors: Jong-hwa Cho, Suwon-si (KR); Joong-gi Kwon, Gunpo-si (KR); Jong-yang Choo, Yongin-si (KR); Chul-woo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 174 days.

(21) Appl. No.: 12/656,087

(22) Filed: Jan. 15, 2010

(65) Prior Publication Data

US 2010/0172672 A1 Jul. 8, 2010

Related U.S. Application Data

(63) Continuation-in-part of application No. 11/962,447, filed on Dec. 21, 2007.

(30) Foreign Application Priority Data

Jul. 13, 2007 (KR) ........................ 10-2007-0070770

(51) Int. Cl.
*H02J 1/10* (2006.01)

(52) U.S. Cl. ........................................................ 307/43

(58) Field of Classification Search ............... 307/43
See application file for complete search history.

(56) References Cited

U.S. PATENT DOCUMENTS

| | | | |
|---|---|---|---|
| 4,481,566 A | 11/1984 | Hoffman et al. | |
| 5,699,236 A * | 12/1997 | Choi ................................ | 363/15 |
| 5,815,771 A * | 9/1998 | Dhande et al. ................... | 399/90 |
| 6,420,954 B1 | 7/2002 | Ahn et al. | |
| 6,900,994 B2 | 5/2005 | Asayama | |
| 7,058,333 B2 | 6/2006 | Shin | |
| 7,369,419 B2 | 5/2008 | Erbito, Jr. | |
| 2004/0108927 A1 | 6/2004 | Castaneda et al. | |
| 2005/0260796 A1 | 11/2005 | Takahashi | |
| 2005/0264959 A1 | 12/2005 | Kim | |
| 2006/0147222 A1 | 7/2006 | Eom | |
| 2006/0176717 A1 | 8/2006 | Chase et al. | |
| 2006/0182459 A1 | 8/2006 | Shin | |
| 2007/0092284 A1* | 4/2007 | Choi ................................ | 399/88 |
| 2008/0231115 A1 | 9/2008 | Cho et al. | |
| 2010/0020510 A1* | 1/2010 | Oh et al. ...................... | 361/748 |

FOREIGN PATENT DOCUMENTS

KR 2002-0024444 3/2002

(Continued)

OTHER PUBLICATIONS

U.S. Office Action received in parent U.S. Appl. No. 11/962,447; mailed Nov. 8, 2010.

(Continued)

*Primary Examiner* — Robert L. Deberadinis

(74) *Attorney, Agent, or Firm* — Staas & Halsey LLP

(57) ABSTRACT

A high voltage power supply apparatus comprising a first circuit disposed on a prepared substrate, and for receiving a first voltage and generating a second voltage that is previously set according to the first voltage, and a second circuit for amplifying and rectifying the second voltage to generate a plurality of high voltage signals, wherein the first circuit and the second circuit are embodied as a single module, wherein at least a portion of the single module is surrounded by an insulator.

10 Claims, 3 Drawing Sheets

FOREIGN PATENT DOCUMENTS

| | | |
|---|---|---|
| KR | 10-2004-0043579 | 5/2004 |
| KR | 10-2006-0088774 | 8/2006 |
| WO | 02/25800 A1 | 3/2002 |

OTHER PUBLICATIONS

U.S. Office Action received in parent U.S. Appl. No. 11/962,447; mailed May 24, 2011.

U.S. Office Action for parent U.S. Appl. No. 11/962,447; mailed May 11, 2010.

U.S. Office Action issued in parent U.S. Appl. No. 11/962,447; mailed Nov. 25, 2009.

U.S. Office Action issued in parent U.S. Appl. No. 11/962,447; mailed Jun. 1, 2009.

U.S. Office Action received in parent U.S. Appl. No. 11/962,447; mailed Aug. 3, 2010.

Notice of Allowance dated Mar. 30, 2012 in parent U.S. Appl. No. 11/962,447.

Chinese Office Action mailed Mar. 1, 2012 in related Chinese Patent Application No. 200810005463.1.

Office Action dated Oct. 23, 2012 in co-pending U.S. Appl. No. 13/544,300.

* cited by examiner

HIGH VOLTAGE POWER SUPPLY APPARATUS

CROSS-REFERENCE TO RELATED PATENT APPLICATION

This application is a continuation-in-part of prior application Ser. No. 11/962,447, filed Dec. 21, 2007, in the U.S. Patent and Trademark Office, which claims the benefit of Korean Patent Application No. 10-2007-0070770, filed on Jul. 13, 2007, in the Korean Intellectual Property Office, the disclosures of which are incorporated herein in their entirety by reference.

BACKGROUND OF THE INVENTION

1. Field of the Invention

The present invention relates to a power supply apparatus, and more particularly, to a high voltage power supply apparatus for generating a high voltage signal by using a low voltage signal.

2. Description of the Related Art

An image forming apparatus such as a laser beam printer (LBP) includes a plurality of devices that electronically operate. Examples of the devices may include a device for uniformly charging a surface of a photosensitive drum included in the image forming apparatus, a device for developing an electrostatic latent image formed on the surface of the photosensitive drum, and a device for transferring the developed electrostatic latent image on a printing medium. Although voltages of power supplied to each of the devices may be different from one another, all of the power may have a signal of direct current (DC) high voltage of a predetermined DC voltage or more (e.g., DC voltage of 1000 V). On the other hand, an alternative current (AC) voltage (e.g., AC voltage for family use of 220 Vrms, where 'rms' refers to 'root mean square') applied to the image forming apparatus is converted into a predetermined DC low voltage signal (e.g., DC voltage of 5 V) and then input to the image forming apparatus, and thus a high voltage power supply apparatus for receiving a low voltage signal to generate a plurality of high voltage signals needs to be installed in the image forming apparatus.

The high voltage power supply apparatus is embodied as a single substrate on which a circuit for receiving a single low voltage signal to generate a plurality of high voltage signals is formed. A plurality of circuit devices are scattered on the substrate according to a designer's plan. Under this environment, there is a limit in minimizing the size of the substrate, and thus it is difficult to satisfy a recent state in which miniaturized products hold a high market share. In a high voltage power supply apparatus, the larger the number of high voltage signals generated using a single signal, the larger the number of circuit devices arranged on the substrate. Accordingly, the larger the number of high voltage signals generated using a single signal, the more difficult to satisfy the recent state.

SUMMARY OF THE INVENTION

The present invention provides a high voltage power supply apparatus having a minimized size.

The present invention also provides an image forming apparatus having a minimized size.

According to an aspect of the present invention, there is provided a high voltage power supply apparatus including a first circuit for receiving a first voltage and generating a second voltage that is previously set according to the first voltage, and a second circuit for amplifying and rectifying the second voltage to generate a plurality of high voltage signals, wherein the first circuit and the second circuit are embodied as a single module, wherein at least a portion of the single module is surrounded by an insulator.

According to another aspect of the present invention, there is provided an image forming apparatus including a high voltage power supply apparatus including a first circuit for receiving a first voltage and generating a second voltage that is previously set according to the first voltage, and a second circuit for amplifying and rectifying the second voltage to generate a plurality of high voltage signals, wherein the first circuit and the second circuit are embodied as a single module, wherein at least a portion of the single module is surrounded by an insulator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of thereof with reference to the attached drawings.

A high voltage power supply apparatus will be described with regard to exemplary embodiments of the invention with reference to the attached drawings.

Figure 1:
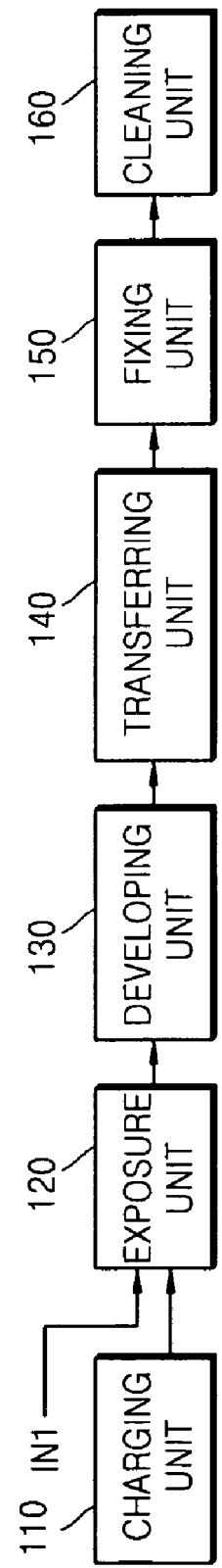
FIG. 1 is a block diagram of an image forming apparatus including a high voltage power supply apparatus according to an embodiment of the present invention.

FIG. 1 is a block diagram of an image forming apparatus including a high voltage power supply apparatus according to an embodiment of the present invention. The image forming apparatus may include a charging unit 110, an exposure unit 120, a developing unit 130, a transferring unit 140, a fixing unit 150, and a cleaning unit 160. Hereinafter, although a case where the high voltage power supply apparatus is installed in the image forming apparatus will be described for convenience of description, the high voltage supply apparatus according to the present embodiment may be used in various electronic apparatuses such as microwave ovens and televisions (TVs).

Throughout this specification, the image forming apparatus refers to a device having a printing function, such as a printer and a multi function peripheral (MFP). Examples of the image forming apparatus may include a laser beam printer for performing single-color printing and a laser beam printer for performing multicolor printing.

The charging unit 110 uniformly charges an entire surface of a photoconductive drum installed in the image forming apparatus with a charge of a predetermined polarity.

Then, the exposure unit 120 performs exposure with respect to a surface of the photoconductive drum according to print data input through an input terminal IN 1 so that an electrostatic latent image is formed so as to corresponding to the print data on a surface of the photoconductive drum. The electrostatic latent image has a predetermined polarity (e.g., +).

The developing unit 130 develops the electrostatic latent image, which is formed on the surface of the photoconductive drum by the exposure unit 120, using a developer (e.g., toner) so that a developed image is formed. The developer has a predetermined polarity (e.g., −).

The transferring unit 140 transfers the developed image, which is formed on the surface of the photoconductive drum by the developing unit 130, on a printing medium. The printing medium is a medium to be printed, and may be formed of paper, an overhead projection (OHP) film or the like.

The fixing unit 150 fixes the developed image, which is transferred on the printing medium by the transferring unit 140, onto the printing medium. In particular, the fixing unit 150 fixes the developed image, which is transferred on the printing medium, onto the printing medium using heat and pressure.

The cleaning unit 160 operates after the operation of the transferring unit 140 is finished, and removes the developer left on the surface of the photoconductive drum. All of the developer, by which the developed image is formed on the surface of the photoconductive drum, needs to be transferred onto the printing medium. However, a part of the developer may actually remain on the surface of the photoconductive drum even after the transferring operation is finished. After the operation of the transferring unit 140 is finished with respect to the print data input through an input terminal IN 1 for an $n_{th}$ time (where n is a natural number), the developer left on the surface of the photoconductive drum deteriorates the print quality of printed matter with respect to the print data, which is input through the input terminal IN 1 for an $n+1_{th}$ time. Thus, prior to the operation of the exposure unit 120 with respect to the print data input for the $n+1_{th}$ time, the developer left on the surface of the photoconductive drum may be clearly removed by the cleaning unit 160.

Each of the charging unit 110, the exposure unit 120, the developing unit 130, the transcription unit 140, the fix unit 150 and the cleaning unit 160 electronically operates using received power. At this time, although power sources to be supplied to each of the charging unit 110, the exposure unit 120, the developing unit 130, the transcription unit 140, the fix unit 150 and the cleaning unit 160 may be different from one another, all of the power may have a signal of direct current (DC) high voltage of a predetermined DC voltage or more (e.g., DC voltage of 1000 V). On the other hand, an alternative current (AC) voltage (e.g., AC voltage for family use of 220 Vrms) applied to the image forming apparatus is converted into a predetermined DC low voltage signal (e.g., DC voltage of 5 V) and then input to the image forming apparatus, and thus a high voltage power supply apparatus for receiving a low voltage signal to generate a plurality of high voltage signals needs to be installed in the image forming apparatus. Hereinafter, high voltage power supply apparatuses will be described with regard to various embodiments of the invention.

Figure 2:
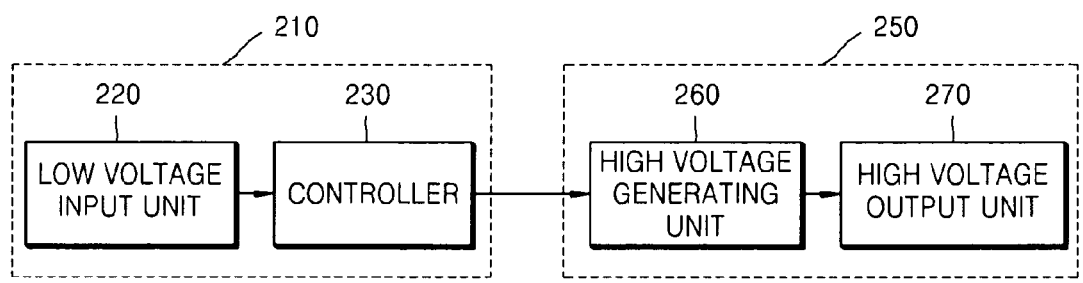
FIG. 2 is a block diagram of a high voltage power supply apparatus according to another embodiment of the present invention.

FIG. 2 is a block diagram of a high voltage power supply apparatus according to another embodiment of the present invention. Referring to FIG. 2, the high voltage power supply apparatus includes a first circuit 210 and a second circuit 250. The first circuit 210 may include a low voltage input unit 220 and a controller 230, and the second circuit 250 may include a high voltage generating unit 260 and a high voltage output unit 270.

A first voltage is input to the low voltage input unit 220.

The controller 230 generates a second voltage according to the input first voltage. The first voltage refers to the above-described 'DC low voltage signal (e.g., DC voltage of 5 V) input to the image forming apparatus', and the second voltage refers to an AC low voltage signal (e.g., AC voltage of 18 Vrms) set according to the first voltage. In this case, the relationship between the first voltage and the second voltage is previously set. To achieve this, the controller 230 may include an oscillation circuit.

The high voltage generating unit 260 amplifies the second voltage in a predetermined ratio, and rectifies the amplification result. In this case, the rectified voltage has an AC high voltage signal of a predetermined voltage or more (e.g., 800 V). Since the rectified voltage may contain some AC components (i.e., shaking), the high voltage generating unit 260 may include an electrolytic condenser for leveling the rectification result. However, hereinafter, it is assumed that the high voltage generating unit 260 does not include the electrolytic condenser for leveling the rectification result, for convenience of description.

Furthermore, the high voltage generating unit 260 may amplify the rectification result in a predetermined ratio. In more detail, the high voltage generating unit 260 may amplify the rectification result many times in different ratios to generate a plurality of high voltage signals. The high voltage signals may be used as the respective power sources of devices that electronically operate in an image forming apparatus. For example, the high voltage generating unit 260 may amplify and rectify the second voltage (e.g., 18 Vrms) to generate a DC high voltage signal (1000 V), and may rectify the generated DC high voltage signal (1000 V) by 1.0 times, 1.2 times and 0.9 times as much to generate three high voltage signals of a DC high voltage signal of 1000 V, a DC high voltage signal of 1200 V, and a DC high voltage signal of 900 V, respectively. Among the three DC high voltage signals, the DC high voltage signal of 1000 V may be supplied to the charging unit 110 illustrated in FIG. 1, as a power source of the charging unit 110, the DC high voltage signal of 900 V may be supplied to the exposure unit 120 illustrated in FIG. 1, as a power source of the exposure unit 120, and the DC high voltage signal of 1200 V may be supplied to the transferring unit 140 illustrated in FIG. 1, as a power source of the transferring unit 140.

The high voltage output unit 270 outputs the high voltage signals generated by the high voltage generating unit 260 though a plurality of output terminals.

The first circuit 210 and the second circuit 250 are embodied as a single module (e.g., integrated chip) on the same substrate. A size of the substrate may be minimized as long as the single module may be formed.

At least a portion of the 'substrate and single module' may be surrounded by an insulator. In detail, at least the portion of the 'substrate and single module' may be disposed in a case, and a space of the case except for the 'substrate and single module' may be filled with the insulator. A case where the substrate and the single module are entirely surrounded by an insulator will be described with reference to FIG. 3.

Figure 3:
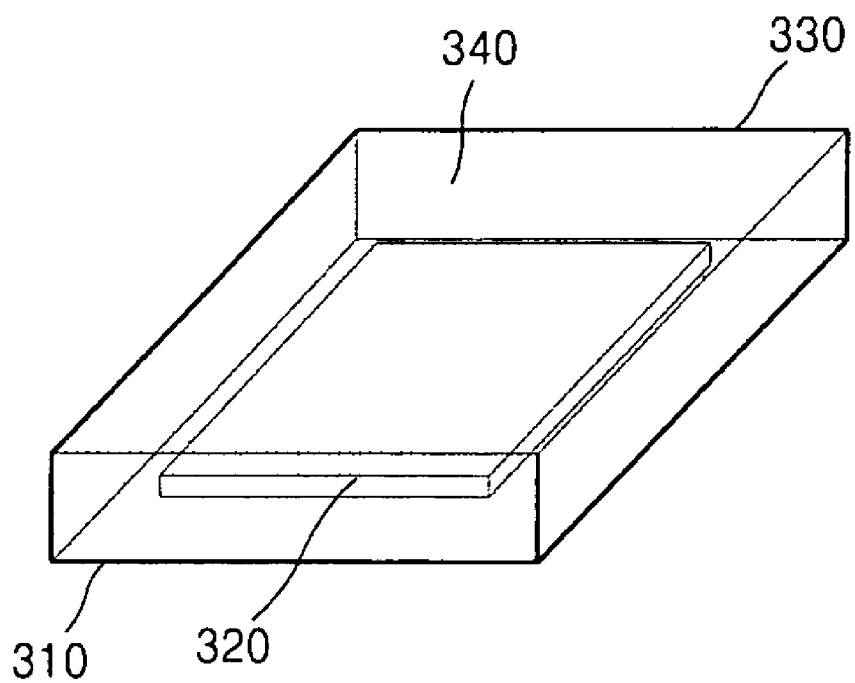
FIG. 3 is a reference diagram for explaining the high voltage power supply apparatus of FIG. 2, according to an embodiment of the present invention.

FIG. 3 is a reference diagram for explaining the high voltage power supply apparatus of FIG. 2, according to an embodiment of the present invention.

Referring to FIG. 3, the first circuit 210 and the second circuit 250 of FIG. 2 may be disposed on a substrate 310, as a single module 320. The substrate 310 and the module 320 may be disposed in a case 330. A space of the case 330 except for a space for the substrate 310 and the module 320 may be filled with an insulator 340. Thus, spark may be prevented from being caused between contact points of the substrate 310 (in particular, between contact points to which high voltage signals are applied and between ground contact points from among the contact points of the substrate 310).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high voltage power supply apparatus comprising:
   a first circuit for receiving a first voltage and generating a second voltage that is previously set according to the first voltage; and
   a second circuit for amplifying and rectifying the second voltage to generate a plurality of high voltage signals, wherein the first circuit and the second circuit are embodied as a single module,
   wherein at least a portion of the single module is surrounded by an insulator.

2. The high voltage power supply apparatus of claim 1, wherein the first circuit comprises a low voltage input unit for receiving the first voltage, and a controller for generating the second voltage, and
   wherein the second voltage comprises a high voltage generating unit for generating the plurality of high voltage signals by amplifying the second voltage in a predetermined ratio, rectifying the amplification result and then amplifying the rectification result, and a high voltage output unit for outputting the plurality of high voltage signals through a plurality of output terminals.

3. The high voltage power supply apparatus of claim 1, wherein at least a portion of the single module is disposed in a predetermined case containing the insulator.

4. The high voltage power supply apparatus of claim 1, wherein the first circuit and the second circuit are embodied on a substrate, and wherein a size of the substrate is minimized as long as the single module is formed.

5. The high voltage power supply apparatus of claim 1, wherein the high voltage generating unit amplifies the rectification result in a predetermined ratio.

6. The high voltage power supply apparatus of claim 5, wherein the high voltage generating unit amplifies the rectification result many times in different ratios to generate a plurality of high voltage signals.

7. The high voltage power supply apparatus of claim 1, wherein the high voltage power supply apparatus is installed in an image forming apparatus.

8. The high voltage power supply apparatus of claim 7, wherein the second circuit amplifies the rectification result many times in different ratios to generate the plurality of high voltage signals, and
   wherein the high voltage signals are used as respective power sources of devices that electronically operates in the image forming apparatus.

9. An image forming apparatus comprising a high voltage power supply apparatus comprising: a first circuit for receiving a first voltage and generating a second voltage that is previously set according to the first voltage; and
   a second circuit for amplifying and rectifying the second voltage to generate a plurality of high voltage signals, wherein the first circuit and the second circuit are embodied as a single module,
   wherein at least a portion of the single module is surrounded by an insulator.

10. The image forming apparatus of claim 9, wherein at least a portion of the single module is disposed in a predetermined case containing the insulator.

* * * * *